Nov. 17, 1942.  R. A. POWER  2,302,472
LAWN MOWER
Filed Nov. 29, 1941

Inventor
Robert A. Power,
By Philip E. Liggers
Attorney

Patented Nov. 17, 1942

2,302,472

UNITED STATES PATENT OFFICE 2,302,472

LAWN MOWER

Robert Alvin Power, Louisville, Miss., assignor of one-half to Marshall Gillis Mitchell, Louisville, Miss.

Application November 29, 1941, Serial No. 421,064

1 Claim. (Cl. 56—25.4)

This invention relates to lawn mowers of the type which employ a single power driven blade revolving in a plane parallel to the ground. Among other objects, the invention aims to provide a lawn mower of the indicated type which employs an improved frame and blade guard, also means to adjust the height of the blade above the ground, also an improved mounting for the motor which drives the blade.

In the accompanying drawing wherein a preferred embodiment of the invention is shown—

Figure 1:
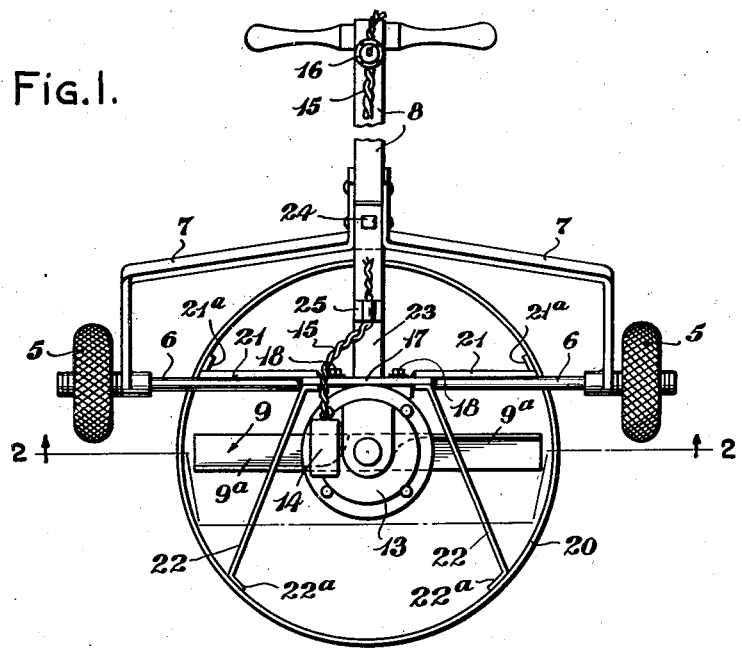
Fig. 1 is a top plan view.

Referring particularly to the drawing, I have shown a lawn mower having wheels 5 freely revolving at the opposite ends of an axle 6, and a pair of handle braces 7 providing a yoke which is fixed to the axle adjacent the wheels and is bolted to the lower end of handle 8. Thus the operator may push, guide, tilt and lift the lawn mower in the familiar manner. The grass cutting blade 9 is a straight flat blade of high carbon steel having sharp edges 9a on opposite sides, and revolves at high speed in a plane parallel to the ground. At its center the blade 9 has a hub 10 with a socket (not shown) receiving the lower end of motor shaft 11, one or more set screws 12 passing through the hub and removably securing the blade to the motor shaft.

The motor 13 which revolves the blade may be an electric motor supported with its shaft 11 perpendicular, as shown, or it may be one of the small gasoline motors of about one-half horsepower which are now available for a multitude of jobs. If an electric motor is used, it will have a small box or casing 14 for making an electrical connection, and a conductor cable 15 will be carried on the handle 8 to a switch 16, also on the handle, so that the motor may be stopped or started quickly. From the upper end of the handle cable 15 will lead to an ordinary electrical outlet at the house or garage. If a gasoline motor is used, a cable will not be necessary but an ordinary spark or gas feed control (not shown) may be mounted on the handle about where switch 16 is shown, so that motor may be started and stopped or have its speed regulated.

Figure 2:
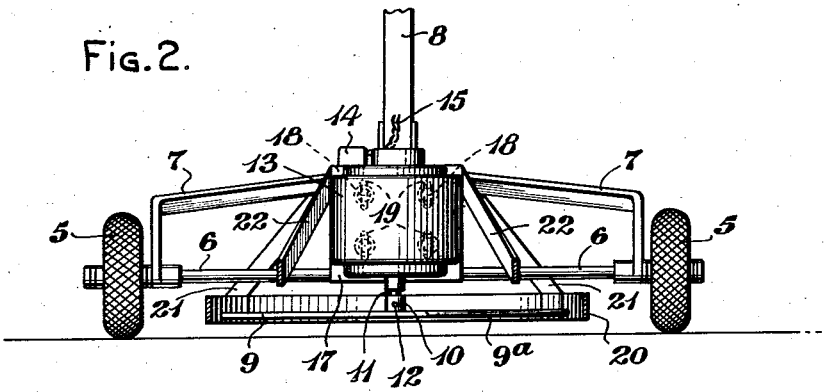
Fig. 2 is a front elevation omitting most of the handle, the view being a section on line 2—2 of Fig. 1.
Figure 3:
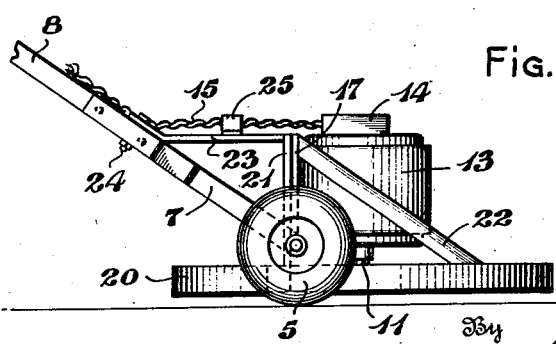
Fig. 3 is a side elevation likewise omitting most of the handle.

To support the motor, vertical motor plate 17 is provided, and bolts 18 pass through the motor base and through parallel vertical slots 19 in the motor plate. Thus the motor may be raised and lowered relative to the motor plate to adjust the height of the grass cutting blade above the ground surface. The lower end of plate 17 is welded or otherwise permanently secured to the side of the axle. A circular blade shield or guard 20 is supported by hangers 21, 22 from the upper end of plate 17, the upper ends of hangers 21, 22 being welded to plate 17 at the corners thereof, but on opposite sides. The lower, outer ends of hangers 21, 22 have flanges 21a, 22a, which are welded to the blade guard on the inside. The length and shapes of hangers 21, 22 are such that the circular blade guard is supported exactly concentric with the axis of rotation of blade 9, and likewise horizontal, with its lower edge almost exactly in the plane of rotation of the cutting edges of the blade. However, as shown in Fig. 2, the blade may be elevated above the lower edge of the guard. Preferably the blade ends are each spaced an inch or so from the inside of the blade guard. Another brace 23 is welded at one end to the plate 17 and at its other end is secured by a bolt 24 to the lower end of the handle. Thus the handle is held at a fixed angle relative to the axle. A clip or loop 25 is preferably secured to the top of brace 23 and cable 15 is run underneath the clip or loop thence up the upper side of the handle, to obviate the likelihood of catching the cable on brush, twigs, etc.

From the foregoing description it will be clear that the motor plate, the handle yoke, the brace 23, the hangers and the blade shield or guard constitute a frame the parts of which are rigidly connected together, said frame being carried on and permanently secured to the axle. However, the wheels, the motor, the blade and the handle may each be removed and replaced without disturbing any of the other removable members. Furthermore adjustment of the blade as described will affect materially the cutting action of the blade as well as the height of the grass left uncut after the mower has passed over it. The mower is very powerful, has a high capacity, and is exceptionally easy to operate; the only work required is to push it over the lawn.

Having described a preferred embodiment of the invention, what I claim as new and desire to secure by Letters Patent is:

A lawn mower including a wheel and axle; a handle secured by a yoke to the axle; a vertical motor plate rigidly secured to the axle; a motor secured to the plate so that its shaft is vertical; means adjustably holding the motor on the plate; a grass cutting blade secured to the lower end of the motor shaft so that it revolves in a plane parallel to the ground; a blade guard surrounding the blade; hangers carrying the blade guard, said hangers being secured to the motor plate; and a brace secured at one end to the plate, and at the other end to the lower end of the handle.

ROBERT ALVIN POWER.